(12) United States Patent
Grbovic

(10) Patent No.: US 7,596,004 B2
(45) Date of Patent: Sep. 29, 2009

(54) SWITCHED-MODE POWER SUPPLY SYSTEM AND SPEED VARIATOR COMPRISING SUCH A SYSTEM

(75) Inventor: Petar Grbovic, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 130 days.

(21) Appl. No.: 11/862,814

(22) Filed: Sep. 27, 2007

(65) Prior Publication Data

US 2008/0080212 A1 Apr. 3, 2008

(30) Foreign Application Priority Data

Sep. 29, 2006 (FR) .................................... 06 54032

(51) Int. Cl.
*H02M 3/335* (2006.01)
(52) U.S. Cl. .................................. 363/21.12; 363/21.04
(58) Field of Classification Search .................... 363/15, 363/16, 20, 21.01, 21.04, 21.09, 21.1, 21.11, 363/21.12, 21.17, 21.18, 97, 131
See application file for complete search history.

(56) References Cited

U.S. PATENT DOCUMENTS 4,581,692 A * 4/1986 Nayberg et al. ............... 363/27

7,154,763 B2 * 12/2006 Yamada et al. ............... 363/16

FOREIGN PATENT DOCUMENTS

| DE | 28 19 676 A1 | 12/1979 |
| EP | 1 107 438 A2 | 6/2001 |
| EP | 1 508 962 A2 | 2/2005 |
| EP | 1 592 119 A2 | 11/2005 |

* cited by examiner

*Primary Examiner*—Gary L Laxton
(74) *Attorney, Agent, or Firm*—Oblon, Spivak, McClelland, Maier & Neustadt, L.L.P.

(57) ABSTRACT

The invention relates to a switched-mode power supply system comprising two buffer capacitors connected in series and connected between the two input terminals of a DC input voltage source, two switches connected in series, a primary inductive assembly connected in series with the two switches, and a secondary winding magnetically coupled to the primary inductive assembly in order to deliver a DC output voltage. A current injection module injects current at a mid-point of the two buffer capacitors in order to generate a current imbalance at this mid-point. A balancing circuit for balancing the leakage currents of the capacitors, one end of said balancing circuit being connected to the mid-point of the buffer capacitors, maintains this imbalance at a predetermined value. The invention also relates to a speed variator using such a power supply system.

16 Claims, 2 Drawing Sheets

SWITCHED-MODE POWER SUPPLY SYSTEM AND SPEED VARIATOR COMPRISING SUCH A SYSTEM

The present invention relates to a switched-mode power supply system with a transformer, in particular of the flyback converter type, delivering, as output, one or more DC voltages from a DC input voltage. One such switched-mode power supply may be used in a speed variator, in particular to supply the electronic modules of the variator. The invention also relates to a speed variator possessing such a power supply.

Many possible architectures applicable to switched-mode power supplies currently exist. The architecture used depends strongly on characteristics and performances required of the power supply, such as the input voltage, the delivered power, the output voltages, the static and dynamic controls, the size, the efficiency, the reliability and the overall cost.

A switched-mode power supply or SMPS may in particular be used in a speed variator of the frequency-converter type intended for controlling an electric motor. Such a switched-mode power supply is then charged with delivering an auxiliary DC voltage for supplying all the electronics of the variator based on a main DC bus voltage of the variator, which bus voltage is output by a rectifier module of the variator. The switched-mode power supply may also serve for supplying the fans of the variator and for offering an isolated external output voltage (24 Vdc) available for the user as output of the variator.

The output voltages delivered by the switched-mode power supply usually range from around 5 to 24 Vdc with an output power of about 100 W or less. The power supply must be regulated so as to keep these output voltages constant, without worrying about the variations in the input voltage and in the output load of the variator. The load variations may in fact range from 0% (no load) to 100% (nominal load), whereas the input voltage variations may range from 350 Vdc to 1500 Vdc.

This is because the DC bus of the variator delivers a very high input voltage, which may also vary greatly depending on the conditions under which the variator is used. The semiconductor switching device of the switched-mode power supply must therefore be able to switch a current of up to 2 A at 1700 Vdc. The conduction and switching losses must also be as low as possible so as to permit high switching frequencies and to reduce the size and the cost of the variator and the passive components, such as the transformer, the inductors and the capacitors.

As energy storage component and as filtering element of the DC bus, it is known to provide an electrolytic buffer capacitor connected between the positive terminal A2 and the negative terminal A1 of the bus. Now, given that the DC voltage of the bus may generally vary between about 600 Vdc and 800 Vdc with deviations ranging sometimes from 350 Vdc up to 1500 Vdc depending on the load downstream of the variator, the buffer capacitor must be able to withstand such an extremely high voltage, which incurs a high cost. To reduce the cost and the size, it is therefore preferred to use two or more buffer capacitors connected in series so as to reduce the voltage to be withstood by each of the capacitors.

However, each electrolytic capacitor generates an intrinsic leakage current and an equivalent series impedance. The use of several buffer capacitors may therefore generate differences in the leakage currents, which means that the voltages across the terminals of each buffer capacitor may differ significantly, given that the bus voltage $V_{bus}$ is generally constant. If there is an imbalance between the leakage currents, this results in a difference between the voltages across the terminals of the various capacitors, resulting in an overvoltage through the capacitor having the lowest leakage current and therefore a rapid reduction in the lifetime of this capacitor.

To avoid this problem and to ensure that the overall bus voltage $V_{bus}$ is correctly divided between the various capacitors in the event of a difference in the leakage currents, it is general practice to add dividing resistors in parallel with each buffer capacitor so as to balance the voltages across the terminals of the various capacitors. However, these dividing resistors are bulky and expensive. In addition, they cause a particular problem due to their power consumption and their high surface temperature, particularly when a compact variator is used.

One of the objectives of the present invention is to automatically balance the buffer capacitor voltages and therefore eliminate the need for these bulky dividing resistors that generate heat losses.

To do this, the invention proposes a switched-mode power supply system comprising two input terminals, namely a negative input terminal and a positive input terminal respectively, which are intended to receive a DC input supply voltage, a capacitive buffer assembly connected between the input terminals and comprising two buffer capacitors connected in series, a first switch and a second switch connected in series and driven by a first and a second control circuit respectively, a primary inductive assembly connected in series with the switches, at least one secondary winding magnetically coupled to the primary inductive assembly in order to deliver a DC output voltage. The power supply system includes a current injection module, injecting current at a mid-point of the two buffer capacitors, in order to generate a current imbalance at this mid-point, and a balancing circuit for balancing the leakage currents of the buffer capacitors, a first end of which is connected to the mid-point of the two buffer capacitors, in order to balance the voltages across the terminals of the two buffer capacitors.

According to one feature, the first switch and the second switch are power transistors of the MOSFET or IGBT type.

According to one feature, the primary inductive assembly is connected in series between the positive input terminal and the two switches, the source of the first switch being connected to the negative input terminal, the drain of the first switch being connected to the source of the second switch, and the drain of the second switch being connected to the primary inductive assembly.

According to another feature, the mid-point of the two buffer capacitors is connected to the gate of the second switch.

According to another feature, the balancing circuit comprises a resistor and a diode connected in series, the anode of said diode being directed towards the mid-point of the two buffer capacitors.

According to another feature, the primary inductive assembly comprises two primary windings connected in series and a mid-point of the two primary windings is connected to a second end of the balancing circuit.

Alternatively, the power supply system comprises a balancing winding magnetically coupled to the primary inductive assembly, one end of which is connected to the positive input terminal and the other end of which is connected to a second end of the balancing circuit.

According to another feature, the current injection module is produced in the second control circuit. The second control circuit therefore comprises a protection zener diode, the cathode of which is connected to the gate of the second switch and the anode of which is connected to the source of the second switch, a bypass diode, the cathode of which is connected to the mid-point of the buffer capacitors and the anode of which is connected to the cathode of the protection diode, and a charging capacitor connected in parallel with the bypass diode.

Other features and advantages will be apparent in the following detailed description, which refers to embodiments given by way of examples and depicted by the appended drawings, in which.

Figure 1:
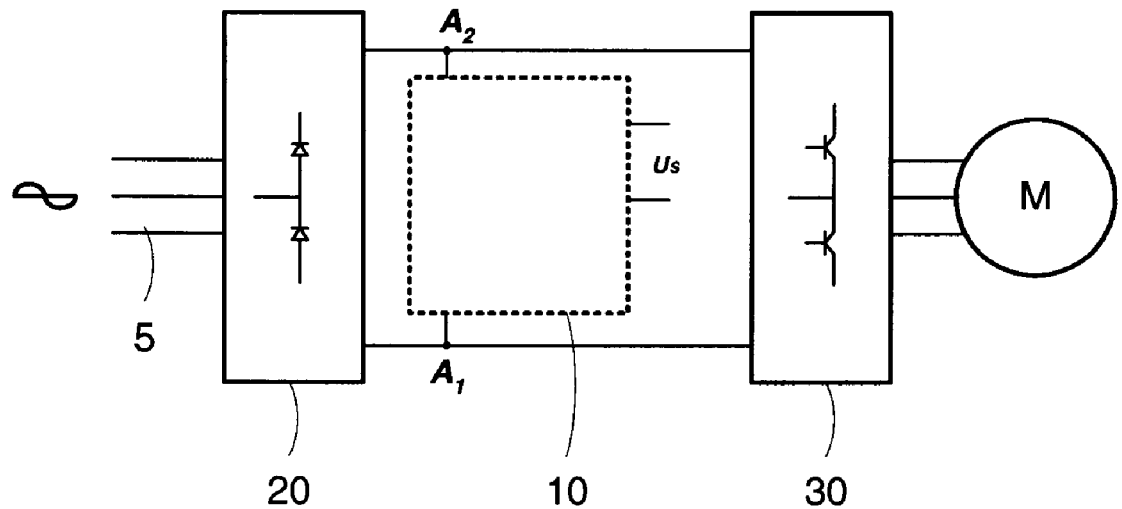
FIG. 1 shows a power supply system integrated into a speed variator.

Referring to FIG. 1, an industrial speed variator is supplied from a three-phase AC power supply mains 5, for example in the 400 V to 690 V voltage range. It is based on an AC/DC/AC architecture (AC: alternating current; DC: direct current). Such a variator includes a rectifier module 20 delivering a DC bus voltage between the positive terminal A2 and the negative terminal A1 from the input AC voltage, which may for example be a three-phase or single-phase voltage. It then includes an inverter module 30 delivering, from this DC bus a variable AC output voltage for supplying the electrical load driven by the variator, such as a three-phase or single-phase motor M. The bus voltage also serves for supplying a switched-mode power supply system 10.

Figure 2:
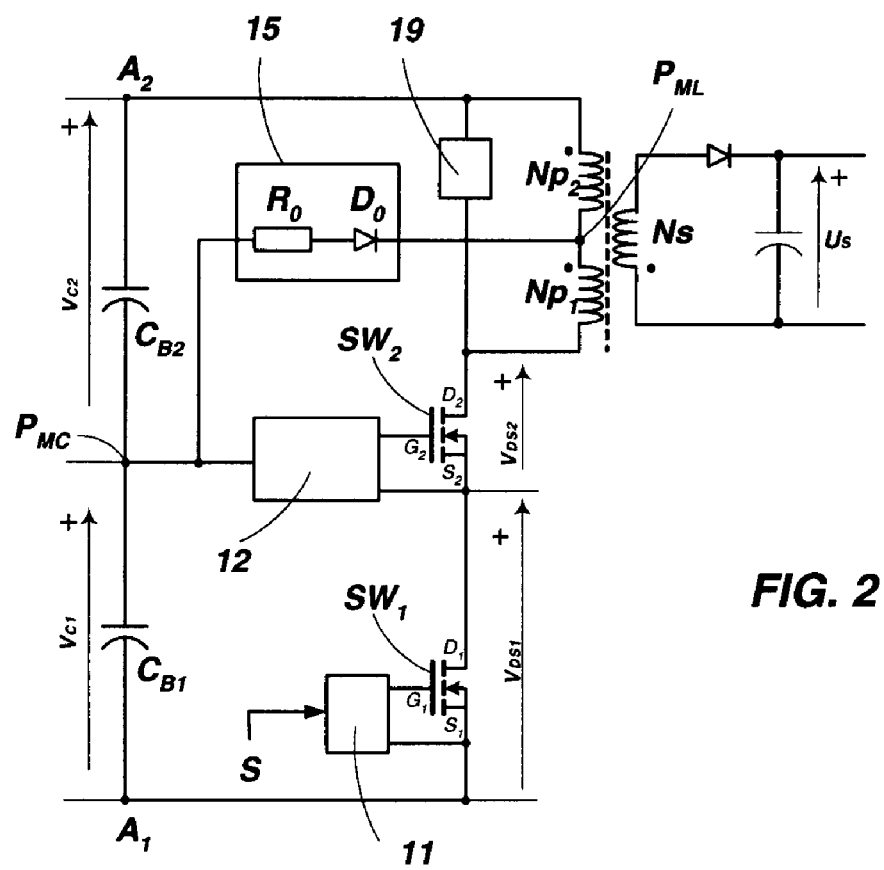
FIG. 2 shows in detail an example of a power supply system according to the invention.

FIG. 2 shows the details of one example of the architecture of the power supply system 10 based on a DC/DC switched-mode supply with an isolated transformer, of the flyback converter type. The invention could also apply to a DC/DC switched-mode power supply with an isolated transformer, of the forward converter type.

The power supply system 10 includes a capacitor buffer assembly which is connected between the input terminals A1 and A2 and comprises two electrolytic buffer capacitors CB1 and CB2 connected in series. A mid-point $P_{MC}$ is positioned between the capacitors CB1 and CB2. The first buffer capacitor CB1 is connected between the negative input terminal A1 and the mid-point $P_{MC}$ of the capacitors. The second buffer capacitor CB2 is connected between the mid-point $P_{MC}$ and the positive input terminal A2. Preferably, the two buffer capacitors CB1, CB2 have the same values and are therefore designed to withstand around one half of the maximum bus voltage $V_{bus}$. One of the objectives of the present invention is to find a simple, easily implementable and inexpensive solution for balancing the voltages across the terminals of the two buffer capacitors CB1, CB2 without having to use dividing resistors.

The power supply system 10 includes a first switch SW1 and a second switch SW2 connected in series and driven by a first control circuit 11 and a second control circuit 12 respectively. The power supply system also includes a primary inductive assembly connected in series with the two switches SW1 and SW2.

Preferably, the two switches SW1 and SW2 are power transistors of the MOSFET or IGBT type, each possessing a gate G, the control of which allows a current to flow between a drain D and a source S. The source S1 of the first switch SW1 is connected to the negative input terminal A1. The drain D1 of the first switch SW1 is connected to the source S2 of the second switch SW2. The drain D2 of the second switch SW2 is connected to one end of the primary inductive assembly. The other end of the primary inductive assembly is connected to the positive input terminal A2. Thus, when the switches SW1 and SW2 are conducting, this means that a current flows through the primary inductive assembly. Moreover, a conventional clamping circuit 19 is added between the positive terminal A2 and the drain D2 of the second switch SW2 in order to protect the latter from overvoltages at the moment of opening it.

The gate G1 and the source S1 of the first switch SW1 are connected to the first control circuit 11. This control circuit 11 is a conventional circuit for opening (turning off) and closing (turning on) a MOSFET transistor. It is driven by an external control signal S, which for example may come from the control unit of the variator. The gate G2 and the source S2 of the second switch SW2 are connected to the second control circuit 12. The structure of the control circuit 12 will be detailed later. The fact of choosing two switches SW1 and SW2 in series makes it possible for the voltage withstood at the terminals of each of the switches to be divided by two, and therefore their cost and their size to be reduced compared with use of a single switch withstanding the entire DC bus voltage.

In the example shown in FIG. 2, the primary inductive assembly is made up of two primary windings Np1, Np2 which are connected directly in series between the positive terminal A2 and the drain D2 of switch SW2. A mid-point $P_{ML}$ is positioned between the two windings Np1, Np2. This mid-point $P_{ML}$ therefore constitutes a fixed voltage source $V_{CL}$, the value of which depends on the ratio of the two windings Np1, Np2. If the primary windings Np1, Np2 have identical inductance values, then the voltage at the mid-point $P_{ML}$ is equal to one half of the bus voltage $V_{bus}$.

Moreover, the power supply system includes one or more secondary windings that are magnetically coupled to the primary inductive assembly Np1, Np2 for the purpose of delivering one or more corresponding DC output voltages. The example in FIG. 2 shows a single secondary winding Ns delivering an isolated secondary output voltage Us. These DC voltages serve to supply various components of the speed variator, especially the electronic circuits, including the control unit of the variator. It does not matter whether some of these output voltages are isolated and others not isolated from the input supply voltage for the DC bus. The advantage of having an isolated voltage is for example to be able to have a DC voltage available for the user as output of the variator.

According to the invention, the power supply system includes a current injection module, which serves to inject an additional current $I_{ADD}$ at the mid-point $P_{MC}$ of the two buffer capacitors so as to create a current imbalance at this mid-point $P_{MC}$. This additional current $I_{ADD}$ will cause the voltage VC1 across the terminals of the first buffer capacitor CB1 to rise, to the detriment of VC2, in such a way that VC1 is greater than or equal to VC2 since VC1+VC2=$V_{bus}$.

The power supply system also includes a balancing circuit 15 intended to keep the imbalance of the leakage currents of the buffer capacitors CB1, CB2 at a predetermined value. The first end of the balancing circuit 15 is connected to the mid-point $P_{MC}$ of the two buffer capacitors. The second end of the balancing circuit 15 is connected to a fixed voltage source $V_{CL}$. Preferably, the balancing circuit 15 is made up of a resistor $R_0$ in series with a diode $D_0$, the anode of the diode $D_0$ being directed towards the mid-point $P_{MC}$.

Figure 5:
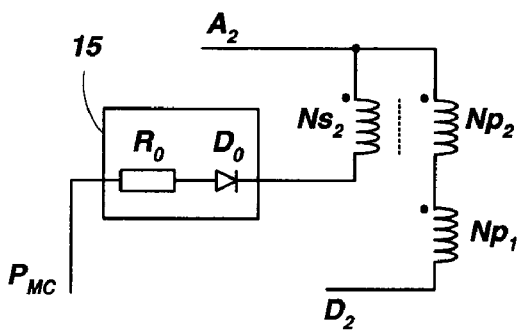
FIG. 5 shows a variant of a balancing circuit for the power supply system.
Figure 6:
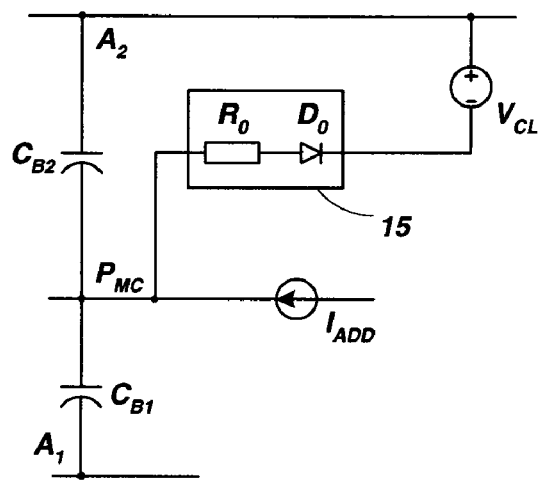
FIG. 6 shows a simplified diagram for the connection of the balancing circuit.

FIG. 6 shows a diagram of the general principle of the connection of the voltage source $V_{CL}$ and the balancing circuit 15, and FIGS. 2 and 5 show two exemplary embodiments.

The voltage source $V_{CL}$ is connected between the positive input terminal A2 and the second end of the balancing circuit 15.

According to first preferred variant, since it is of very simple construction, indicated in FIG. 2, the second end of the balancing circuit 15 is connected directly to the mid-point $P_{ML}$ of the two primary windings Np1, Np2, which therefore constitutes the voltage source $V_{CL}$. One of the windings Np2 is therefore connected between the positive terminal A2 and the balancing circuit 15. The balancing circuit 15 thus makes it possible to balance the voltage VC2 with the voltage $V_{CL}$, since the diode $D_0$ will conduct current as long as the voltage VC1 is above $V_{CL}$ (or as long as the voltage VC2 is below $V_{CL}$). A current will therefore flow through the balancing circuit 15 until VC1 is equal to $V_{CL}$. If $V_{CL}$ is chosen to be one half of the bus voltage $V_{bus}$ (i.e. when the two primary windings Np1, Np2 are identical), then the voltages VC1 and VC2 are thus maintained at one half of the overall bus voltage $V_{bus}$ (since VC1≧VC2) and therefore the desired balancing is achieved.

In a second variant indicated in FIG. 5, the voltage source $V_{CL}$ is formed from a secondary balancing winding Ns2 magnetically coupled to the primary inductive assembly. The second end of the balancing circuit 15 is connected to one end of the secondary balancing winding Ns2, the other end of this balancing winding Ns2 being connected to the positive input terminal A2. The inductance of this specific balancing winding Ns2 is for example defined as one half of the primary inductance so as in this way to be able to keep the voltage VC2 at one half of $V_{bus}$. It should be pointed out that, in this second variant, the primary inductive assembly may then be made up of one or two primary windings, since the mid-point $P_{ML}$ is no longer used.

The current injection module therefore intentionally creates a voltage imbalance at the mid-point $P_{MC}$ by injecting the additional current $I_{ADD}$ (see FIG. 6), thus making it possible for the balancing circuit 15 to regulate this imbalance about a value predetermined by the voltage source.

The module for injecting the additional current $I_{ADD}$ could be produced by any additional current source. For example, this current source could be created using an additional resistor connected in parallel with the buffer capacitor CB2 or using an external converter circuit connected to the terminals A1, A2 and to the point $P_{MC}$. However, these solutions require the use of a large resistor, thus incurring compulsory heat losses.

Figure 3:
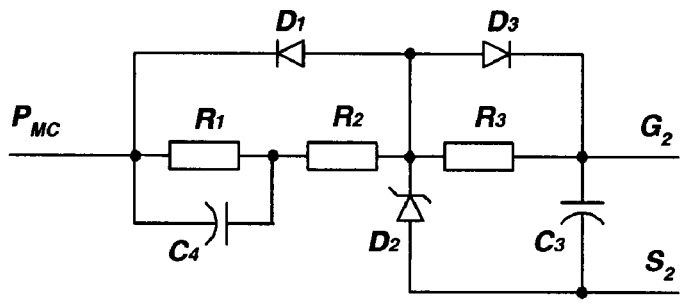
FIG. 3 shows a preferred embodiment of a control circuit for a switch of the power supply system.
Figure 4:
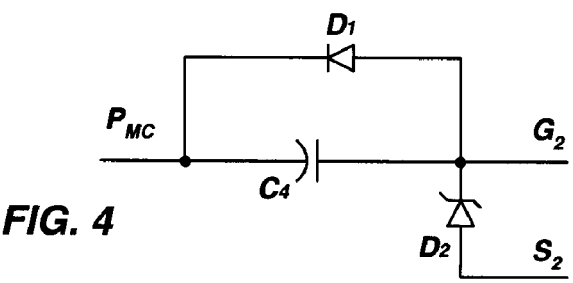
FIG. 4 shows a second embodiment of this control circuit.

This is why the invention advantageously proposes for this current injection module to be produced in the second control circuit 12, two embodiments of which are shown in detail in FIGS. 3 and 4. Thus, the role of the second control circuit 12 is the following: to synchronize the second switch SW2 with the first switch SW1 (i.e. to open SW2 when SW1 is open and close SW2 when SW1 is closed) and to inject an additional current $I_{ADD}$ at the mid-point $P_{MC}$.

FIG. 4 shows a minimal embodiment of the second control circuit 12 of the second switch SW2. In this embodiment, the control circuit 12 comprises a protection zener diode D2 connected between the gate G2 and the source S2 of the switch SW2, the anode of the protection diode D2 being directed towards the source S2. The control circuit 12 also includes a bypass diode D1 connected between the gate G2 of the switch SW2 and the mid-point $P_{MC}$ of the capacitors CB1, CB2, the anode of the bypass diode D1 being directed towards the gate G2. Finally, the control circuit 12 includes a charging capacitor C4 in parallel with the bypass diode D1. The operation of such a control circuit 12 is as follows:

sequence for closing the switches SW1 and SW2. We assume initially that the two switches SW1 and SW2 are open. Control of the switches is initialized by a closing command for the signal S input into the first control circuit 11. The first switch SW1 is directly controlled, whereas the second switch SW2 is controlled via the voltage VDS1 between the source S1 and the drain D1 of the switch SW1. This voltage VDS1 drops when the switch SW1 closes. Consequently, a charging current -IC4 flows through the charging capacitor C4 towards the source-gate capacitor CSG2 of the switch SW2. Thus, the gate-source voltage VGS2 increases. At the moment when this voltage VGS2 reaches the breakdown voltage of the zener diode D2 (for example around 10 to 15 V), then a drain-source current IDS2 starts to flow and to discharge the drain-gate and drain-source capacitors of the switch SW2. Consequently, the drain-source voltage VDS2 of the switch SW2 drops. Because of the Miller effect, the voltage VGS2 remains approximately constant, whereas the voltage VDS2 drops. Once the voltage VDS2 reaches zero, the voltage VGS2 continues to rise and forces the MOSFET SW2 switch into the resistive linear region. The voltage VGS2 increases up to the breakdown voltage of the diode. The voltage VGS2 and the current IC4 then become zero. Shortly afterwards, the switch SW2 is fully supplied. The biased current needed to maintain a stable state is the leakage current of the bypass diode D1 which flows through the zener diode D2;

sequence for opening the switches SW1 and SW2. We now assume that the two switches SW1 and SW2 are closed. The voltage VGS2 is a maximum and the capacitor C4 is fully charged. Control of the switches is initialized by an opening command for the signal S input into the first control circuit 11. The first switch SW1 is controlled directly, whereas the switch SW2 is controlled by the voltage VDS1. When the switch SW1 opens, the voltage VDS1 starts to increase. The protection diode D2 is reverse-biased and the charging capacitor C4 can discharge with a discharge current IC4 flowing to the mid-point $P_{MC}$. This discharge current IC4 is approximately the inverse of the charging current -IC4 occurring during the closure phase of SW1, SW2. Once the voltage VDS1 has reached $V_{bus}/2$, the capacitor C4 is discharged and D1 starts to conduct a current ID1. For quite a short time, the switch SW1 is open while the switch SW2 is not yet open. Therefore during this time, the current flowing through SW2 is diverted towards the diodes D1 and D2 and the mid-point $P_{MC}$. At the same time, the capacitor CSG2 has discharged and the voltage VGS2 has dropped. As long as the voltage VGS2 is still above the Miller voltage, the switch SW2 conducts. At the moment when the voltage VGS2 has reached the Miller voltage, the switch SW2 starts to open and the current ID1 then drops back to zero.

The situation as regards the main currents flowing through the second control circuit 12 involves the following:
  a charging current -IC4, for charging the capacitor C4 during the closure phase;
  a reverse current IC4, for discharging C4 during the opening phase; and
  a current ID1 flowing to the mid-point $P_{MC}$ through D1 and D2 when SW1 is open and SW2 is closed, during the opening phase.

As the phases of opening and closing SW1 and SW2 rapidly follow each other during normal operation of the power supply system, the sum of these currents delivers overall the additional current $I_{ADD}$ that flows to the mid-point $P_{MC}$.

FIG. 3 shows a preferred embodiment of the second control circuit 12 for the second switch SW2. In this embodiment, certain passive components have been added to the embodiment shown in FIG. 4, for greater efficiency of the power supply system.

This preferred embodiment comprises a filter made up from a filtering resistor R3, connected between the gate G2 of the switch SW2 and the cathode of the protection diode D2, and from a filtering capacitor C3 between the anode of the diode D2 and the source S2 of SW2. The main purpose of this filter is to delay the opening of the switch SW2, and therefore to increase the flow time of the current ID1 and therefore to ensure a higher current $I_{ADD}$. FIG. 3 also shows, in parallel with the resistor R3, an acceleration diode D3 with its cathode directed towards the gate G2. The diode D3 shunts the resistor R3 during closure of SW2, in order to accelerate switching. Finally, FIG. 3 shows two biased resistors R1 and R2. The resistor R1 is connected in parallel with the capacitor C4, and the resistor R2 is inserted between the capacitor C4 and the cathode of the diode D2. The purpose of R1 is to improve the conduction of the switch SW2 in the closed state. The purpose of R2 is to damp any oscillations due to any parasitic inductance of the second control circuit 12.

The switched-mode power supply system described in the present invention can obviously be used in any DC/DC converter and is not limited to a speed variator.

Of course, it is possible, without departing from the scope of the invention, to imagine other variants and detailed improvements and even to envisage the use of equivalent means.

The invention claimed is:

1. A switched-mode power supply system comprising:
two input terminals including a negative input terminal and a positive input terminal that receive a DC input supply voltage;
a capacitive buffer assembly connected between the input terminals and comprising two buffer capacitors connected in series;
a first switch and a second switch of the MOSFET or IGBT power transistor type, which are driven by a first and a second control circuit respectively;
a primary inductive assembly;
at least one secondary winding magnetically coupled to the primary inductive assembly to deliver a DC output voltage;
the primary inductive assembly is connected in series between the positive input terminal and the first switch and the second switch, a source of the first switch is connected to the negative input terminal, a drain of the first switch is connected to a source of the second switch, and a drain of the second switch is connected to the primary inductive assembly;
a current injection module configured to inject current at a mid-point of the two buffer capacitors to generate a current imbalance at the mid-point; and
a balancing circuit configured to balance leakage currents of the two buffer capacitors, a first end of the balancing circuit is connected to the mid-point of the two buffer capacitors to balance voltages across terminals of the two buffer capacitors.

2. The power supply system according to claim 1, wherein the mid-point of the two buffer capacitors is connected to a gate of the second switch.

3. The power supply system according to claim 1 or 2, wherein the balancing circuit comprises a resistor and a diode connected in series, an anode of said diode is directed towards the mid-point of the two buffer capacitors.

4. The power supply system according to claim 3, wherein the primary inductive assembly comprises two primary windings connected in series and a mid-point of the two primary windings is connected to a second end of the balancing circuit.

5. The power supply system according to claim 3, further comprising:
a balancing winding magnetically coupled to the primary inductive assembly having one end connected to the positive input terminal and an other end connected to a second end of the balancing circuit.

6. The power supply system according to claim 2, further comprising a second control circuit that comprises:
a protection zener diode including a cathode connected to the gate of the second switch and an anode connected to the source of the second switch;
a bypass diode including a cathode connected to the mid-point of the buffer capacitors and an anode connected to the cathode of the protection zener diode; and
a charging capacitor connected in parallel with the bypass diode.

7. The power supply system according to claim 2, further comprising a second control circuit that comprises:
a protection zener diode including an anode connected to the source of the second switch and a cathode connected to the gate of the second switch via a filtering resistor;
a bypass diode including a cathode connected to the mid-point of the buffer capacitors and an anode connected to the cathode of the protection zener diode;
an acceleration diode in parallel with the filtering resistor, the acceleration diode including a cathode directed to the gate of the second switch;
a filtering capacitor connected between the gate of the second switch and the source of the second switch; and
a charging capacitor connected to the mid-point of the two buffer capacitors and to the cathode of the protection diode via a biasing resistor.

8. The power supply system according to claim 1, wherein the system delivers several output voltages, and some of the several output voltages are isolated and others are not isolated from the DC input supply voltage.

9. A speed variator comprising:
a rectifier module delivering a DC input voltage;
an inverter module delivering a variable output voltage to an electrical load; and
a power supply system which is supplied by the DC input voltage, the power supply system including
two input terminals including a negative input terminal and a positive input terminal that receive the DC input voltage,
a capacitive buffer assembly connected between the input terminals and comprising two buffer capacitors connected in series,
a first switch and a second switch of the MOSFET or IGBT power transistor type, which are driven by a first and a second control circuit respectively,
a primary inductive assembly,
at least one secondary winding magnetically coupled to the primary inductive assembly to deliver a DC output voltage,
the primary inductive assembly is connected in series between the positive input terminal and the first switch and the second switch, a source of the first switch is connected to the negative input terminal, a drain of the first switch is connected to a source of the second switch, and a drain of the second switch is connected to the primary inductive assembly, a current injection module configured to inject current at a mid-point of the two buffer capacitors to generate a current imbalance at the mid-point, and a balancing circuit configured to balance leakage currents of the two buffer capacitors, a first end of the balancing circuit is connected to the mid-point of the two buffer capacitors to balance the voltages across the terminals of the two buffer capacitors.

10. The speed variator according to claim 9, wherein the mid-point of the two buffer capacitors is connected to a gate of the second switch.

11. The speed variator according to claim 10, further comprising a second control circuit that comprises:

a protection zener diode including a cathode connected to the gate of the second switch and an anode connected to the source of the second switch;

a bypass diode including a cathode connected to the mid-point of the buffer capacitors and an anode connected to the cathode of the protection zener diode; and a charging capacitor connected in parallel with the bypass diode.

12. The speed variator according to claim 10, further comprising a second control circuit that comprises:

a protection zener diode including an anode connected to the source of the second switch and a cathode connected to the gate of the second switch via a filtering resistor;

a bypass diode including a cathode connected to the mid-point of the buffer capacitors and an anode connected to the cathode of the protection zener diode;

an acceleration diode in parallel with the filtering resistor, the acceleration diode including a cathode directed to the gate of the second switch;

a filtering capacitor connected between the gate of the second switch and the source of the second switch; and a charging capacitor connected to the mid-point of the two buffer capacitors and to the cathode of the protection diode via a biasing resistor.

13. The speed variator according to claim 9 or 10, wherein the balancing circuit comprises a resistor and a diode connected in series, an anode of said diode is directed towards the mid-point of the two buffer capacitors.

14. The speed variator according to claim 13, wherein the primary inductive assembly comprises two primary windings connected in series and a mid-point of the two primary windings is connected to a second end of the balancing circuit.

15. The speed variator according to claim 13, further comprising:

a balancing winding magnetically coupled to the primary inductive assembly having one end connected to the positive input terminal and an other end connected to a second end of the balancing circuit.

16. The speed variator according to claim 9, wherein the power supply system delivers several output voltages, and some of the several output voltages are isolated and others are not isolated from the DC input voltage.

* * * * *